(12) United States Patent
Zhou et al.

(10) Patent No.: US 9,717,069 B2
(45) Date of Patent: Jul. 25, 2017

(54) INTRA-CLUSTER D2D RETRANSMISSION WITH INSTANTANEOUS LINK ADAPTATION AND ADAPTIVE NUMBER OF RE-TRANSMITTER

(75) Inventors: Bin Zhou, Shanghai (CN); Jing Xu, Shanghai (CN); Wenjia Lin, Hang Zhou (CN); Haifeng Wang, Shanghai (CN); Zhenhong Li, Shanghai (CN)

(73) Assignee: Nokia Technologies Oy, Espoo (FI)

( * ) Notice: Subject to any disclaimer, the term of this patent is extended or adjusted under 35 U.S.C. 154(b) by 46 days.

(21) Appl. No.: 13/990,821

(22) PCT Filed: Dec. 3, 2010

(86) PCT No.: PCT/CN2010/079420
§ 371 (c)(1),
(2), (4) Date: May 31, 2013

(87) PCT Pub. No.: WO2012/071736
PCT Pub. Date: Jun. 7, 2012

(65) Prior Publication Data
US 2013/0250843 A1    Sep. 26, 2013

(51) Int. Cl.
*H04W 72/00* (2009.01)
*H04L 1/00* (2006.01)
*H04L 1/18* (2006.01)
*H04W 28/18* (2009.01)
*H04W 92/18* (2009.01)

(52) U.S. Cl.
CPC ......... *H04W 72/005* (2013.01); *H04L 1/0015* (2013.01); *H04L 1/1825* (2013.01);
(Continued)

(58) Field of Classification Search
CPC ................ H04L 1/18; H04W 72/1226; H04W 72/1231; H04W 52/09; H04W 40/02;
(Continued)

(56) References Cited

U.S. PATENT DOCUMENTS

2004/0071128 A1\*    4/2004    Jang et al. ..................... 370/349
2009/0233544 A1\*    9/2009    Oyman .............. H04B 7/15592
                                                              455/7
(Continued)

FOREIGN PATENT DOCUMENTS

CN             101282204          10/2008
WO      WO 2008046822 A1 \*    4/2008
WO           2010006650           1/2010

OTHER PUBLICATIONS

International Search Report received for corresponding Patent Cooperation Treaty Application No. PCT/CN2010/079420, dated Sep. 15, 2011, 3 pages.

(Continued)

*Primary Examiner* — Gary Mui
*Assistant Examiner* — Stephen Steiner
(74) *Attorney, Agent, or Firm* — Mintz Levin Cohn Ferris Glovsky and Popeo, P.C.

(57) ABSTRACT

A method for intra-cluster D2D retransmission comprises: calculating parameters of a first and a second retransmission modes for an acknowledgement device in a cluster at which data from a network node is decoded correctly; reporting the parameters to the network node; and determining whether or not to retransmit the data to at least one non-acknowledgement device in the cluster at which the data from the network node is decoded incorrectly, in response to a selection between the first and the second retransmission modes from the network node based at least in part on the parameters according to a pre-determined criterion.

22 Claims, 9 Drawing Sheets

(a)

(b)

(52) U.S. Cl.
CPC .......... *H04L 1/1864* (2013.01); *H04L 1/1887* (2013.01); *H04L 1/0026* (2013.01); *H04L 2001/0092* (2013.01); *H04W 28/18* (2013.01); *H04W 92/18* (2013.01)

(58) Field of Classification Search
CPC ..... H04W 40/12; H04W 40/22; H04W 88/04; H04W 84/18; H04W 16/02
USPC ....... 370/312, 279, 293, 315–326, 328, 400, 370/432, 465, 492
See application file for complete search history.

(56) References Cited

U.S. PATENT DOCUMENTS

| | | | | |
|---|---|---|---|---|
| 2009/0262678 | A1* | 10/2009 | Oyman | H04B 7/024 370/315 |
| 2009/0319824 | A1* | 12/2009 | Liu | H04L 12/1868 714/4.1 |
| 2010/0093364 | A1 | 4/2010 | Ribeiro et al. | |
| 2012/0182860 | A1* | 7/2012 | Liu et al. | 370/216 |

OTHER PUBLICATIONS

Hou et al., "A Cooperative Multicast Scheduling Scheme for Multimedia Services in IEEE 802.16 Networks", IEEE Transactions on Wireless Communications, vol. 8, No. 3, Mar. 2009, pp. 1508-1519.

Fitzek et al., "Cognitive Wireless Networks Concepts, Methodologies and Visions Inspiring the Age of Enlightenment of Wireless Communications", Springer, 2007, 32 pages.

Lehtomaki et al., "Direct Communication Between Terminals in Infrastructure Based Networks", Proceedings of ICT—MobileSummit, 2008, pp. 1-8.

Popova et al., "Enhanced Downlink Capacity in UMTS Supported by Direct Mobile-to-Mobile Data Transfer", IFIP International Federation for Information Processing Networking Conference, vol. 4479, May 2007, pp. 522-534.

Zhang et al., "Design And Performance Evaluation Of Cooperative Retransmission Scheme For Reliable Multicast Services In Cellular Controlled P2P Networks", IEEE 18th International Symposium on Personal, Indoor and Mobile Radio Communications, Sep. 3-7, 2007, 5 pages.

Zhu et al., "QoS Aware Wireless Bandwidth Aggregation (QAWBA) by Integrating Cellular and Ad-Hoc Networks", First International Conference on Quality of Service in Heterogeneous Wired/Wireless Networks, Oct. 18-20, 2004, 8 pages.

Bonta et al., "Ad Hoc Relay Mode for Mobile Coverage Extension and Peer To-Peer Communications" IEEE 802.16 Broadband Wireless Access Working Group, IEEE 802.16m-07/040, Nov. 9, 2007, pp. 1-11.

* cited by examiner

INTRA-CLUSTER D2D RETRANSMISSION WITH INSTANTANEOUS LINK ADAPTATION AND ADAPTIVE NUMBER OF RE-TRANSMITTER

RELATED APPLICATION

This application was originally filed as PCT Application No. PCT/CN2010/079420 filed Dec. 3, 2010.

FIELD OF THE INVENTION

The present invention generally relates to communication networks. More specifically, the invention relates to intra-cluster device-to-device (D2D) retransmission.

BACKGROUND

In current infrastructure based networks, a base station (BS), as a centralized controller, is the only access point for mobile devices to the network service. Mobile devices can only communicate with a certain BS via the cellular uplink or downlink. However, enabling device-to-device (D2D) direct communications when mobile devices are close to each other may offer many advantages, which comprise longer battery life, more efficient resource usage, coverage extension, lower interference level and so on. More recently, using the D2D technology in combination with cellular networks is becoming a promising concept. In such D2D enhanced cellular system, D2D direct communications could benefit from the centralized architecture of the cellular networks. On the other hand, the efficiency of the conventional cellular systems can be greatly improved by exploiting the higher channel quality of D2D direct links.

SUMMARY

The present description involves the enhanced cellular downlink multicast/broadcast by an additional D2D direct communications, and the intra-cluster D2D retransmission with instantaneous link adaptation and adaptive number of re-transmitter(s).

According to a first aspect of the present invention, there is provided a method comprising: calculating parameters of a first and a second retransmission modes for an acknowledgement (ACK) device in a cluster at which data from a network node is decoded correctly; reporting the parameters to the network node; and determining whether or not to retransmit the data to at least one non-acknowledgement (NACK) device in the cluster at which the data from the network node is decoded incorrectly, in response to a selection between the first and the second retransmission modes from the network node based at least in part on the parameters according to a pre-determined criterion.

According to a second aspect of the present invention, there is provided an apparatus comprising: at least one processor; and at least one memory including computer program code, the at least one memory and the computer program code configured to, with the at least one processor, cause the apparatus to perform at least the following: calculating parameters of a first and a second retransmission modes for the apparatus in a cluster at which data from a network node is decoded correctly; reporting the parameters to the network node; and determining whether or not to retransmit the data to at least one NACK device in the cluster at which the data from the network node is decoded incorrectly, in response to a selection between the first and the second retransmission modes from the network node based at least in part on the parameters according to a pre-determined criterion.

According to a third aspect of the present invention, there is provided a computer program product comprising a computer-readable medium bearing computer program code embodied therein for use with a computer, the computer program code comprising: code for calculating parameters of a first and a second retransmission modes for an ACK device in a cluster at which data from a network node is decoded correctly; code for reporting the parameters to the network node; and code for determining whether or not to retransmit the data to at least one NACK device in the cluster at which the data from the network node is decoded incorrectly, in response to a selection between the first and the second retransmission modes from the network node based at least in part on the parameters according to a pre-determined criterion.

According to a fourth aspect of the present invention, there is provided an apparatus comprising: calculating means for calculating parameters of a first and a second retransmission modes for an ACK device in a cluster at which data from a network node is decoded correctly; reporting means for reporting the parameters to the network node; and determining means for determining whether or not to retransmit the data to at least one NACK device in the cluster at which the data from the network node is decoded incorrectly, in response to a selection between the first and the second retransmission modes from the network node based at least in part on the parameters according to a pre-determined criterion.

In accordance with exemplary embodiments, said determining whether or not to retransmit the data to the at least one NACK device may comprise: multicasting the data to all the NACK devices in the cluster, if the ACK device is assigned as a sender in the first retransmission mode; and multicasting the data to each member of a subset of all the NACK devices in the cluster, if the ACK device is assigned as a sender in the second retransmission mode.

According to an exemplary embodiment, the parameter of the first retransmission mode may comprise a first modulation and coding scheme which is selected based at least in part on the worst link among links connecting the ACK device and all the NACK devices in the cluster. On the other hand, the parameters of the second retransmission mode may comprise: a bitmap representing a subset of all the NACK devices in the cluster; and a second modulation and coding scheme which is selected based at least in part on the worst link among links connecting the ACK device and the NACK devices within the subset. According to an exemplary embodiment, a channel quality of a link between the ACK device and each NACK device within the subset is higher than those of links between the ACK device and other NACK devices in the cluster which are not within the subset. For example, the ACK device may calculate these parameters of the first and the second retransmission modes based at least in part on the intra-cluster pilots broadcasting from the NACK devices.

In accordance with exemplary embodiments, said calculating the parameters of the first and the second retransmission modes for the ACK device may comprise checking pilots broadcasted by all NACK devices in the cluster to obtain at least one of the following: which devices in the cluster are the NACK devices; and channel qualities of links between the ACK device and all the NACK devices in the cluster.

According to exemplary embodiments, if the second retransmission mode is selected, ACK devices which are assigned as senders in the device-to-device retransmission multicast the data to each member of their respective subsets of NACK devices, and the union of the subsets covers all the NACK devices in the cluster.

According to a fifth aspect of the present invention, there is provided a method comprising: receiving parameters of a first and a second retransmission modes for ACK devices in a cluster at which data from a network node is decoded correctly; and performing a selection between the first and the second retransmission modes based at least in part on the parameters according to a pre-determined criterion, wherein the selection comprises assigning at least one of the ACK devices as a sender to retransmit the data to at least one NACK device in the cluster at which the data from the network node is decoded incorrectly.

According to a sixth aspect of the present invention, there is provided an apparatus comprising: at least one processor; and at least one memory including computer program code, the at least one memory and the computer program code configured to, with the at least one processor, cause the apparatus to perform at least the following: receiving parameters of a first and a second retransmission modes for ACK devices in a cluster at which data from the apparatus is decoded correctly; and performing a selection between the first and the second retransmission modes based at least in part on the parameters according to a pre-determined criterion, wherein the selection comprises assigning at least one of the ACK devices as a sender to retransmit the data to at least one NACK device in the cluster at which the data from the apparatus is decoded incorrectly.

According to a seventh aspect of the present invention, there is provided a computer program product comprising a computer-readable medium bearing computer program code embodied therein for use with a computer, the computer program code comprising: code for receiving parameters of a first and a second retransmission modes for ACK devices in a cluster at which data from a network node is decoded correctly; and code for performing a selection between the first and the second retransmission modes based at least in part on the parameters according to a pre-determined criterion, wherein the selection comprises assigning at least one of the ACK devices as a sender to retransmit the data to at least one NACK device in the cluster at which the data from the network node is decoded incorrectly.

According to an eighth aspect of the present invention, there is provided an apparatus comprising: receiving means for receiving parameters of a first and a second retransmission modes for ACK devices in a cluster at which data from a network node is decoded correctly; and performing means for performing a selection between the first and the second retransmission modes based at least in part on the parameters according to a pre-determined criterion, wherein the selection comprises assigning at least one of the ACK devices as a sender to retransmit the data to at least one NACK device in the cluster at which the data from the network node is decoded incorrectly.

In accordance with exemplary embodiments, the pre-determined criterion comprises a criterion that the least resource is used for the device-to-device retransmission. The parameters of a first retransmission mode and a second retransmission mode may comprise link information for resource cost evaluation, for example, channel quality metrics such as spectrum efficiency, modulation and coding scheme and etc. In an exemplary embodiment, a size of the subset may be fixed or pre-defined by the network node.

According to exemplary embodiments, if the first retransmission mode is selected, one of the ACK devices is assigned as a sender to multicast the data to all the NACK devices in the cluster. On the other hand, if the second retransmission mode is selected, several ACK devices are assigned as senders to multicast the data to each member of their respective subsets of NACK devices, and the union of the subsets covers all the NACK devices in the cluster.

In exemplary embodiments of the present invention, the provided methods, apparatus, devices, network node and computer program products take into account the instantaneous link adaptation and adaptive re-transmitter(s) selection, which can significantly reduce the resource cost on the D2D local retransmission for cellular multicast enhancement.

BRIEF DESCRIPTION OF THE DRAWINGS

The invention itself, the preferable mode of use and further objectives are best understood by reference to the following detailed description of the embodiments when read in conjunction with the accompanying drawings, in which.

DETAILED DESCRIPTION OF THE INVENTION

The embodiments of the present invention are described in detail with reference to the accompanying drawings. Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

Figure 1:
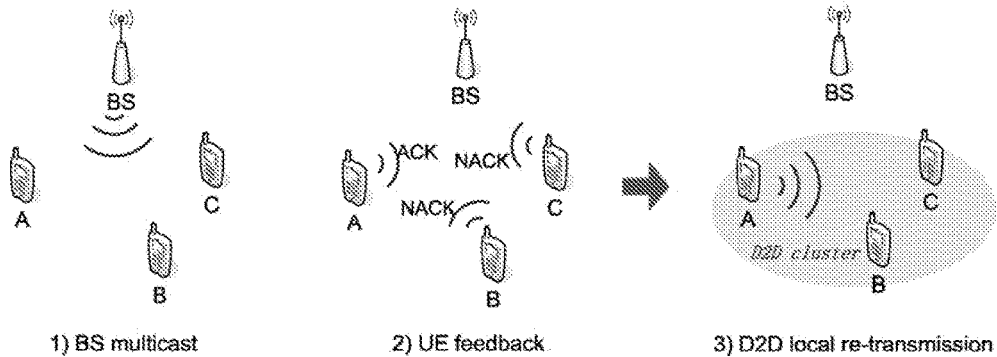
FIG. 1 is a diagram exemplarily illustrating the D2D enhanced cellular downlink multicast in accordance with an embodiment of the present invention.

An exemplary scenario is presented in FIG. 1 where the cellular downlink multicast/broadcast is enhanced by additional D2D direct communications among mobile devices/user equipments (UEs). As shown in FIG. 1, several cellular mobile devices (for example devices A, B and C denoted in FIG. 1) in the proximity of each other form a D2D cluster. Members of the D2D cluster are capable of communicating directly with each other. All the devices of this D2D cluster are interested in downloading the same data file from the cellular network. For this reason, a BS sends the same transport block to all the devices of the D2D cluster simultaneously by multicasting. Due to the independent fading of the downlink channels, some devices/UEs of D2D cluster (such as device A, which are defined as acknowledge (ACK) devices herein), can decode the transport block successfully whereas others (such as device B and device C, which are defined as non-acknowledge (NACK) devices herein) may not. To allow ACK devices to retransmit the current transport block to NACK devices over D2D direct links can increase the efficiency of cellular radio resource usage and also reduce the system delay. Here it is assumed that the radio resource for intra-cluster D2D communications, for example retransmissions, is guaranteed by the BS from the resource for the main cellular system operation, and the orthogonal resource usage of D2D and cellular communications may be provided.

In order to efficiently use radio resource for the D2D local retransmission as illustrated in FIG. 1, it is needed to know how many ACK devices and which ACK devices in the cluster may be employed for the D2D local retransmission. It is also desirable to design a D2D retransmission scheme with limited feedback and signaling and to make a proper determination as to what kind of feedback and signaling is needed to support this D2D retransmission.

One approach of enabling the intra-cluster D2D retransmission is that all of the ACK devices in a cluster participate in the D2D local retransmission by sending the same data on the same resource. However, so many devices participate in the D2D local retransmission is a waste of resource and battery life. In addition, it is very hard to design a good link adaptation for the D2D retransmission in this scheme because Channel Quality Indicator (CQI) of links connecting all ACK devices and all NACK devices should be feedback to the BS, which is a heavy burden of the system.

Another approach is to assign one pre-defined device (for instance, a cluster head) for the D2D local retransmission by multicasting. A problem may occur when the cluster head is a NACK device and fails to receive the current transport block, and the BS re-scheduling or re-transmitting is an extra overhead to the system. Further, in order to ensure the correct decoding at every NACK device, a Modulation and Coding Scheme (MCS) of the D2D retransmission, such as BPSK (Binary Phase Shift Keying), QPSK (Quadrature Phase Shift Keying), QAM (Quadrature Amplitude Modulation) and so on, has to be selected based on the worst link between the cluster header and all the NACK devices. Sometimes, only one bad D2D link in the cluster could severely bottleneck the throughput of D2D retransmission. That is also a waste of resource.

An alternative approach is to select only one ACK device to perform D2D local retransmission by multicasting. However, resource cost in this scheme is not always efficient. Another approach is to select more than one ACK devices to perform D2D local retransmission, where each re-transmitter uses orthogonal resource to multicast. Similarly, resource cost in this scheme is also not always efficient, which may be detailed hereafter.

Thus there is a need to provide a D2D retransmission scheme with limited feedback and signaling, in order to efficiently use radio resources for the aforementioned D2D local retransmissions. It is desirable to design a scheme which takes into account the instantaneous link adaptation and adaptive re-transmitter(s) selection, so as to significantly reduce the resource cost on the D2D local retransmission.

Figure 2:
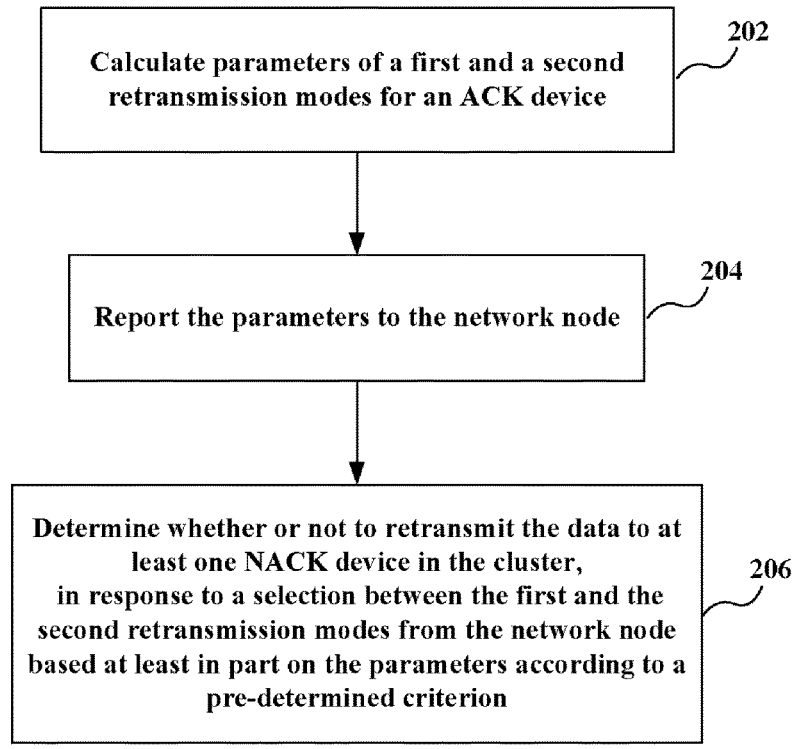
FIG. 2 is a flowchart illustrating a method for intra-cluster D2D retransmission which may be implemented at a mobile device in accordance with embodiments of the present invention.

FIG. 2 is a flowchart illustrating a method for intra-cluster D2D retransmission which may be implemented at an ACK device in accordance with embodiments of the present invention. In a communication network comprising a network node and one or more devices, the network node (such as a BS/eNB/control center) may multicast data to all the devices (such as UEs, mobile terminals, wireless devices and etc.) within a cluster. All devices are in the radio range of each other and are able to communicate. As mentioned above, ACK devices in the cluster may decode the data correctly whereas NACK devices may not. The method illustrated in FIG. 2 describes operations of an ACK device in a process for selecting a D2D retransmission mode adaptively.

In block 202, an ACK device calculates parameters of a first retransmission mode (such as conservative mode) and a second retransmission mode (such as aggressive mode). For example, for each time of BS multicasting the data (such as a transport block), the ACK device may calculate these parameters of the two modes according to the intra-cluster pilots broadcasting from NACK devices in the D2D cluster. The parameters of a first retransmission mode and a second retransmission mode may comprise link information for resource cost evaluation, for example, channel quality metrics such as spectrum efficiency, MCS and etc. In accordance with exemplary embodiments, for calculating the parameters of the first and the second retransmission modes, the ACK device may check pilots broadcasted by all NACK devices in the cluster to obtain at least one of the following: which devices in the cluster are the NACK devices (for example, by inferring the corresponding sender's identity from the received pilot); and channel qualities of links between the ACK device and all the NACK devices in the cluster.

In an exemplary embodiment, the parameter of the first retransmission mode (such as conservative mode) may comprise a first modulation and coding scheme ($MCS_1$) which is selected based at least in part on the worst link among links connecting the ACK device and all the NACK devices in the cluster. On the other hand, the parameters of the second retransmission mode (such as aggressive mode) may comprise a bitmap (BITMAP) representing a subset of all the NACK devices in the cluster, and a second modulation and coding scheme ($MCS_2$) which is selected based at least in part on the worst link among links connecting the ACK device and the NACK devices within the subset. The BITMAP specified for this ACK device may be used to indicate several NACK devices in the cluster which have high channel quality with this ACK device. In other words, a channel quality of a link between this ACK device and each NACK device within the subset is higher than those of links between the ACK device and other NACK devices in the cluster which are not within the subset.

According to an exemplary embodiment, a size of the subset may be fixed or pre-defined by the network node. For example, the number of high-CQI NACK devices feedback in BITMAP can be configured by the network node (such as a BS). Then, each ACK device in the cluster feedbacks its $MCS_1$, $MCS_2$ and BITMAP to the BS via a new uplink feedback channel that may need standardization efforts. In order to enable BITMAP feedback, a possible approach is to pre-order all the devices in a D2D cluster during the D2D cluster setup phase. In this circumstance, the signaling related to pre-ordering can be done only once, so the overhead is negligible. The BITMAP fed back by a certain ACK device may be used to indicate which NACK devices in the cluster are currently served by this ACK device. It can be implemented as an N-bit vector, where each device in the cluster is represented by 1 bit. For example, if a NACK device is served by this ACK device, the corresponding bit is "1"; otherwise, the bit is "0". This is described later in detail with reference to FIG. 8.

In block 204, the ACK device reports the parameters to the network node. According to the feedback from each of the ACK devices in the cluster, the network node may decide how the D2D retransmission is performed, for example, based at least in part on the parameters received from the ACK devices according to a pre-determined criterion. In an exemplary embodiment, the pre-determined criterion may comprise a criterion that the least resource is used for the D2D retransmission.

In block 206, the ACK device may determine whether or not to retransmit the data to at least one NACK device in the cluster, in response to a selection between the first and the second retransmission modes from the network node based at least in part on the parameters according to a pre-determined criterion. In an exemplary embodiment, if the ACK device is assigned as a sender in the first retransmission mode, it may multicast the data to all the NACK devices in the cluster. Alternatively, if the ACK device is assigned as a sender in the second retransmission mode, it may multicast the data to each member of a subset of all the NACK devices in the cluster. The subset here is specific to the ACK device. In fact, if the second retransmission mode (such as aggressive mode) is selected, in addition to the above ACK device, there may be other ACK devices which are also assigned as senders in the D2D retransmission. These assigned ACK devices multicast the data to each member of their respective subsets of NACK devices, and the union of the subsets covers all the NACK devices in the cluster.

Figure 3:
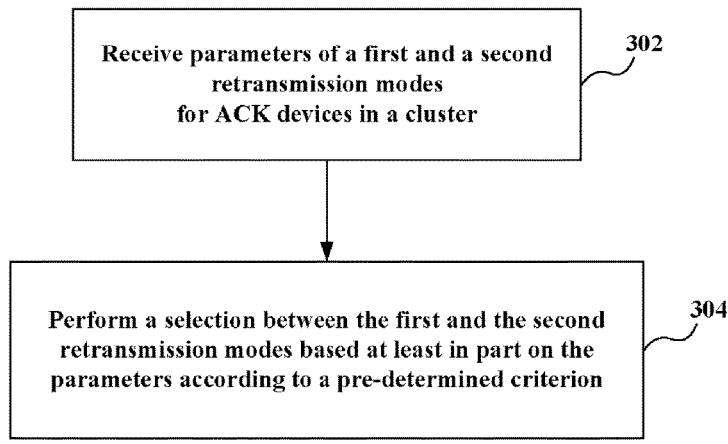
FIG. 3 is a flowchart illustrating a method for intra-cluster D2D retransmission which may be implemented at a network node in accordance with embodiments of the present invention.

Reference is now made to FIG. 3, which is a flowchart illustrating a method for intra-cluster D2D retransmission which may be implemented at a network node in accordance with embodiments of the present invention. A network node such as a BS/eNB/control center may send data such as a transport block to each of devices within a cluster, as shown in FIG. 1. As mentioned previously, the cluster may comprise ACK devices and NACK devices, and the data from the network node is decoded correctly at the ACK devices and incorrectly at the NACK devices. The ACK devices may calculate some parameters related to retransmission modes according to the method illustrated in FIG. 2. The network node may receive parameters of a first and a second retransmission modes for ACK devices in a cluster, as shown in block 302.

Similar to the above description with reference to FIG. 2, the parameter of the first retransmission mode (such as conservative mode) received from each ACK device may comprise a first modulation and coding scheme ($MCS_1$) which is selected based at least in part on the worst link among links connecting the corresponding ACK device and all the NACK devices in the cluster. The parameters of the second retransmission mode (such as aggressive mode) received from each ACK device may comprise a bitmap (BITMAP) representing a subset of all the NACK devices in the cluster, and a second modulation and coding scheme ($MCS_2$) which is selected based at least in part on the worst link among links connecting the corresponding ACK device and the NACK devices within the subset. It is noted that a channel quality of a link between this ACK device and each NACK device within its subset is higher than those of links between the ACK device and other NACK devices in the cluster which are not within the subset.

In block 304, the network node can perform a selection between the first and the second retransmission modes based at least in part on the parameters according to a pre-determined criterion. For example, the selection may comprise assigning at least one ACK device as a sender to retransmit the data to at least one NACK device in the cluster. In an exemplary embodiment, if the first retransmission mode (such as conservative mode) is selected, one of the ACK devices is assigned as a sender to multicast the data to all the NACK devices in the cluster. However, if the second retransmission mode (such as aggressive mode) is selected, several ACK devices may be assigned as senders to multicast the data to each member of their respective subsets of NACK devices. It is noted that the union of subsets (represented by BITMAP) of these ACK devices covers all the NACK devices in the cluster.

The various blocks shown in FIG. 2 and FIG. 3 may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

As mentioned previously, the pre-determined criterion considered by a network node for adaptively selecting a D2D retransmission mode may comprise a criterion that the least resource is used for the D2D retransmission. The following exemplary embodiments of evaluation of resource cost on the local D2D retransmission are described with reference to FIG. 4 and FIG. 5.

Figure 4:
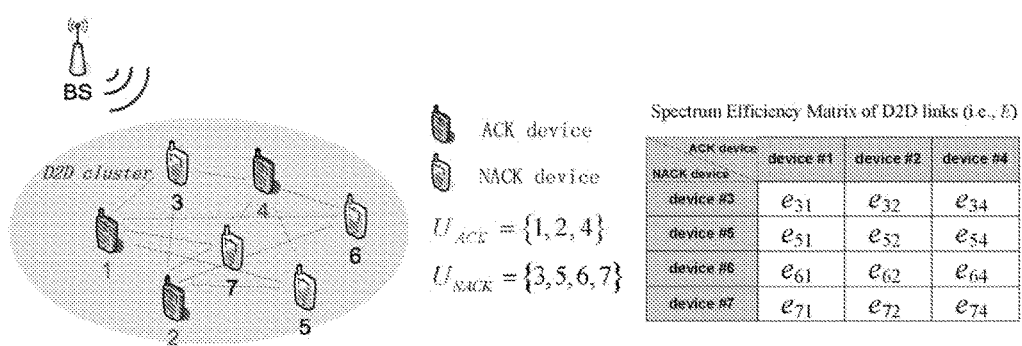
FIG. 4 shows an example of a D2D cluster, the ACK/NACK device set and spectrum efficiency matrix in accordance with embodiments of the present invention.

In general, a D2D cluster is made up of N mobile devices, of which $N_{ACK}$ denotes ACK devices and $N_{NACK}$ denotes NACK devices, and thus $N_{ACK}+N_{NACK}=N$. The D2D cluster is denoted as set $U=\{1, 2, 3, \ldots N\}$. All the ACK devices within the D2D cluster constitute set $U_{ACK}$, and all the NACK devices within the D2D cluster constitute set $U_{NACK}$, where $U_{ACK} \cup U_{NACK}=U$, $U_{ACK} \cap U_{NACK}=\emptyset$. The spectrum efficiency of the D2D link connecting NACK device m and ACK device n is denoted as $e_{mn}$ (bit/second/Hz). All these spectrum efficiency of D2D links constitute a matrix with the size of $N_{NACK} \times N_{ACK}$, which is denoted as E. The cellular multicast data to be retransmitted over D2D links is denoted as C (bits). FIG. 4 gives an example in case of N=7.

Due to the shared nature of wireless channel, multicast transmission is an efficient way to transmit the same content from a single sender to multiple receivers, and therefore it is well suitable for the aforementioned local retransmission within a D2D cluster. However, in order to ensure the correct decoding at every receiver, the MCS of D2D multicast may be selected based on the worst link between the sender and the receivers. Sometimes, only one bad D2D link in a cluster could severely bottleneck the throughput of D2D multicast. That is a waste of resource.

Although any ACK device in set $U_{ACK}$ can be selected as a sender to retransmit the cellular multicast data C within a D2D group, the efficiency of D2D radio resource usage depends heavily on which ACK devices are the senders and how many senders are selected. This argument can be supported by the following formulation.

Figure 5:
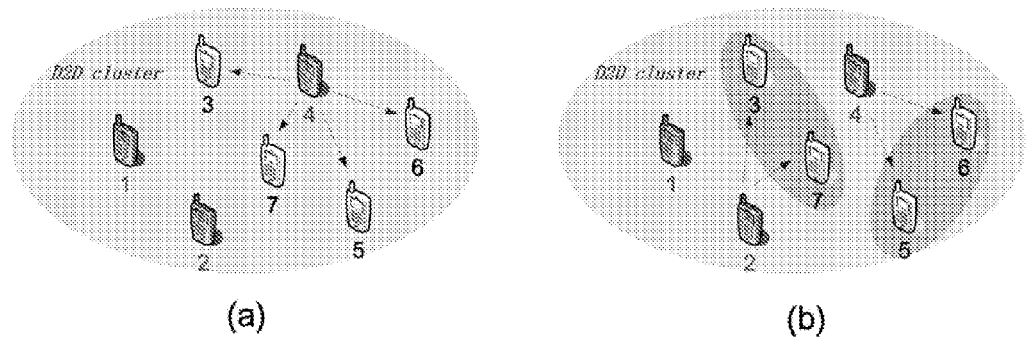
FIG. 5 shows an example of one sender and two senders in a D2D cluster in accordance with embodiments of the present invention.

If only one ACK device is assigned as a sender to multicast data C upon all the NACK devices in the cluster (for example, in case that the conservative mode is selected as the retransmission mode), as shown in part (a) of FIG. 5, in order to ensure the correct decoding at every NACK device, the minimal resource cost on local D2D retransmission is:

$$cost_1 = \mathop{\mathrm{argmin}}_{n \in U_{ACK}} \left\{ \frac{C}{\mathop{\mathrm{argmin}}_{m \in U_{NACK}} (e_{mn})} \right\} \quad (1)$$

If two ACK devices (such as ACK devices i and j) are assigned as senders (for example, in case that the aggressive mode is selected as the retransmission mode), as shown in part (b) of FIG. 5, each of the senders multicasts the same data C upon only part of the NACK devices in the cluster, and the senders use orthogonal resource for multicast to avoid interference. In this case, the minimal resource cost on local D2D retransmission is:

$$cost_2 = \mathop{\mathrm{argmin}}_{\substack{i,j \in U_{ACK} \\ U_i \cup U_j = U_{NACK}}} \left\{ \frac{C}{\mathop{\mathrm{argmin}}_{m \in U_i}(e_{mi})} + \frac{C}{\mathop{\mathrm{argmin}}_{m \in U_i}(e_{mj})} \right\} \quad (2)$$

where subset $U_i$ comprises the NACK devices receiving data C from ACK device i (such as device #2 as sender #1) and subset $U_j$ comprises the NACK devices receiving data C from ACK device j (such as device #4 as sender #2).

More generally, if there are L ACK devices (such as ACK device $\#n_1, \#n_2 \ldots \#n_L$) assigned as senders (for example, in case that the aggressive mode is selected as the retransmission mode), each of the senders multicasts the same data C upon only part of the NACK devices in the cluster, and all the senders use the orthogonal resource for multicast to avoid interference. In this case, the minimal resource cost on local D2D retransmission is:

$$cost_L = \mathop{\mathrm{argmin}}_{\substack{n_k \in U_{ACK}, k=1,2 \cdots L \\ U_{n_1} \cup U_{n_2} \cdots \cup U_{n_L} = U_{NACK}}} \left\{ \sum_{k=1}^{L} \frac{C}{\mathop{\mathrm{argmin}}_{m \in U_{n_k}}(e_{mn_k})} \right\} \quad (3)$$

where subset $U_{n_k}$ comprises the NACK devices receiving data C (bits) from ACK device $n_k$ (as sender #k), and the spectrum efficiency of a link connecting NACK device m and ACK device $n_k$ is denoted as $e_{mn_k}$.

From formula (1), (2) and (3), the resource cost on the D2D local retransmission may be represented as a function of the spectrum efficiency of D2D links (such as matrix E), and it is also closely related to the number of senders and the subset partition of NACK devices. It is possible to decide how many senders are needed for the most efficient resource usage with a case-by-case analysis on all the D2D links' channel qualities.

Although there may be an extra computation burden on a network node to perform the proposed adaptive scheme, the complexity is negligible versus the network node's processing power. The network node may be required to inform all devices in the cluster of the result of retransmission mode selection, for example, via downlink signaling. But it is a necessary overhead for any centralized scheduling system.

Figure 6A:
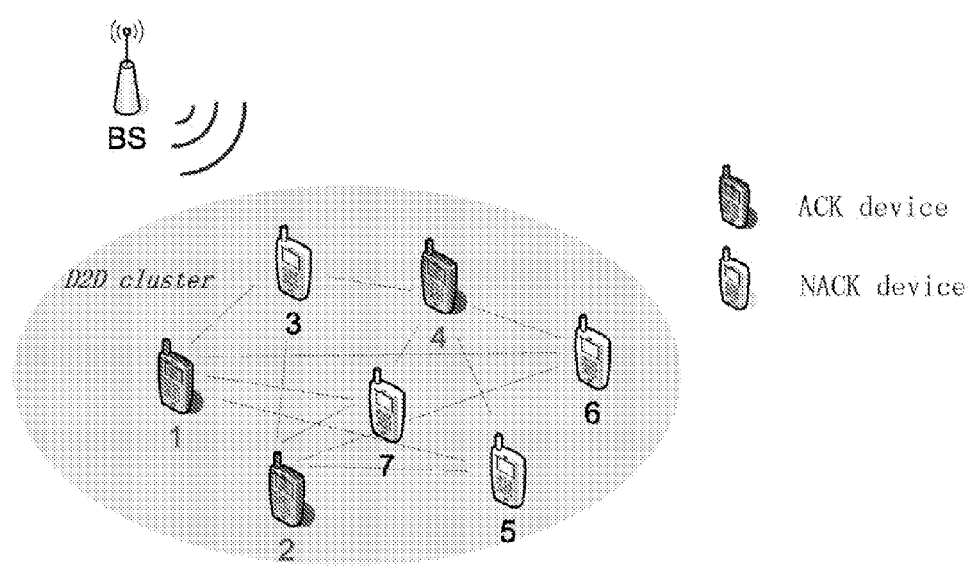
FIG. 6a exemplarily shows a situation where a network node broadcasts the same transport block to all the devices of a cluster, in accordance with embodiments of the present invention.

Some exemplary embodiments with respect to the intra-cluster D2D retransmission and selection of a retransmission mode are presented here. FIG. 6a exemplarily shows a situation where a network node broadcasts the same transport block to all the devices of a cluster, in accordance with embodiments of the present invention. The communication system such as a cellular network shown in FIG. 6a may comprise one or more network nodes such as a BS/eNB or an access point (AP) as a centralized controller, as well as one or more devices such as UEs. For simplicity, FIG. 6a only shows one BS and seven devices within a D2D cluster. It can be realized that the BS may serve more devices, and there may be more BSs located in the communication network.

As shown in FIG. 6a, several cellular mobile devices in the proximity of each other form a D2D cluster. Members of the D2D cluster are capable of communicating directly with each other. All the devices of D2D cluster are interested in downloading the same data file from the cellular network. For this reason, the BS sends the same transport block to all the devices of the D2D cluster simultaneously by multicasting. After BS multicasting, some devices of D2D cluster (denoted as ACK devices) successfully decode the broadcast transport block whereas other devices (denoted as NACK devices) fail to decode it.

Figure 7A:
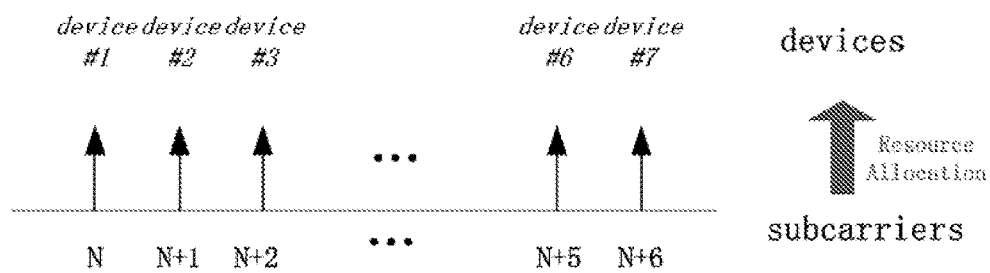
FIG. 7a exemplarily shows orthogonal resource allocation for NACK device pilots broadcasting in accordance with an embodiment of the present invention.
Figure 7B:
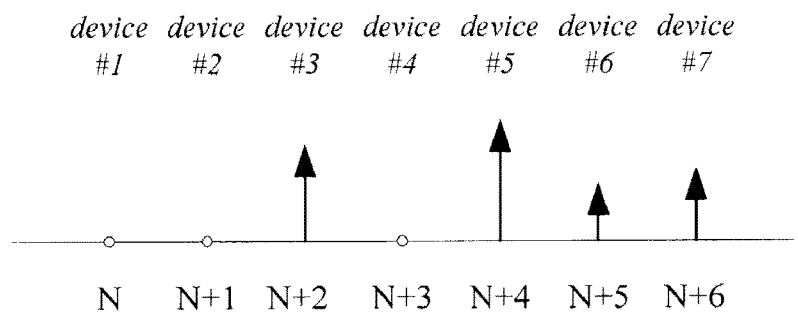
FIG. 7b exemplarily shows the received pilot signal at the ACK device side in accordance with an embodiment of the present invention.

Then, instead of sending NACK signal back to BS, all the NACK devices broadcast their respective pilots within the D2D cluster on the pre-defined orthogonal resource, and all the ACK devices listen on this orthogonal resource. For example, the orthogonal resource may be a series of subcarriers, spreading codes, time slots or any combination of the above. The resources may be allocated to each device of the cluster in advance by the BS for the aforementioned pilots-broadcasting purpose. The correspondence between resource and device is fixed and may be signaled to each device during the D2D cluster setup phase or in default, so that once pilots on a certain resource are detected, the corresponding sender's identity (ID) can be inferred by the receiver. FIG. 7a exemplarily shows such orthogonal resource allocation for NACK device pilots broadcasting in accordance with an embodiment of the present invention. As shown in FIG. 7a, subcarrier N is allocated to device #1, subcarrier N+1 to device #2 . . . , and subcarrier N+6 to device #7. For example, assuming that device #1, #2 and #4 are ACK devices, then device #3, #5, #6 and #7 may broadcast their pilots respectively on subcarriers N+2, N+4, N+5 and N+6. FIG. 7b exemplarily shows the received pilot signal at the ACK device side, correspondingly.

By checking the received pilot signal on the pre-defined resource, each ACK device can have the knowledge that: 1) which devices are NACK devices in current transport block reception (because an ACK device does not broadcast pilots on its resource); 2) channel quality of the links connecting it and all the NACK devices (channel reciprocity is assumed).

According to the number of ACK devices and NACK devices in the D2D cluster, there may be three cases as follows.

Case 1: all the devices in the cluster successfully decode the transport block from the BS.

In this case, all the devices listen and no one broadcast pilots. By checking the received pilots, every device of the cluster know that all other devices successfully received the current transport block. Then, ACK devices feedback an ACK signal to the BS which means that all the devices of the cluster have successfully received the current transport block and the BS can prepare the new transport block multicasting.

Case 2: all the devices in the cluster fail to decode the transport block from the BS.

In this case, all the devices broadcast their pilots and no one listen. No device of the cluster knows others reception situation. No feedbacks from the D2D cluster to the BS. Then, the BS prepares the retransmission for the current transport block broadcasting. The possibility of this case is very low. For example, when the target Block Error Rate (BLER) is 10% and the D2D cluster size is 7, the probability is $10^{-7}$.

Case 3: some but not all devices in the cluster successfully decode the transport block from the BS.

In this case, all NACK devices broadcast their pilots and all ACK devices listen. By checking the received pilots, every ACK device knows which devices in the cluster failed to receive the current transport block and what the channel quality of links between it and all NACK devices are. Then, retransmission for NACK devices occurs only within the D2D cluster, from the ACK device(s) to the NACK device(s), in order to increase efficiency of cellular radio resource usage.

In exemplary embodiments, link adaptation of the aforementioned D2D retransmission is proposed to perform a selection of retransmission modes according to a pre-determined criterion. With knowledge of NACK devices and channel qualities of the related links, each ACK device of the cluster may report information about two D2D retransmission modes to the BS.

Figure 6B:
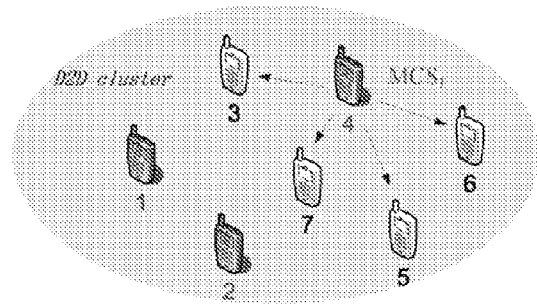
FIG. 6b exemplarily shows the conservative mode of ACK device #4 in accordance with an embodiment of the present invention.

In the first mode (which is also called as conservative mode), MCS of retransmission may be selected based at least in part on the worst link among links connecting the reporting ACK device and all the NACK devices. It is noted that only the selected MCS is reported to the BS for the conservative mode. For example, as shown in FIG. 6b, device #4 is an ACK device, MCS of retransmission (which is denoted as MCS) is selected based at least in part on the worst link among links connecting device #4 and devices #3, #6, #5 & #7. $MCS_1$ may be feedback to the BS as illustrated in FIG. 8 which exemplarily shows implementation of uplink signaling for an ACK device in accordance with embodiments of the present invention.

Figure 6C:
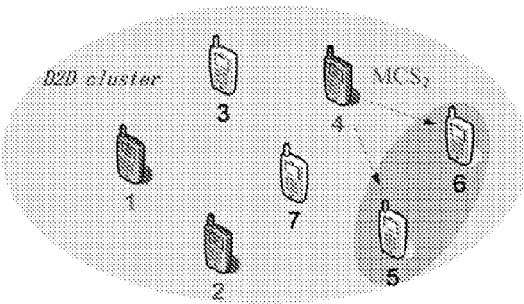
FIG. 6c exemplarily shows the aggressive mode of ACK device #4 in accordance with an embodiment of the present invention.

In the second mode (which is also called as aggressive mode), each ACK device may select several NACK devices in the cluster which have the highest channel quality with itself. These several selected NACK devices is a SUBSET of all the NACK devices in the cluster and these SUBSETs are ACK-device-specific. The size of SUBSET can be fixed or be pre-defined by the BS. For example, if the size of SUBSET is fixed or be pre-defined by the BS as 3, then the ACK device would select three NACK devices in the cluster, which respectively have the first, the second and the third highest channel quality with the ACK device. With the determined SUBSET, each ACK device may select MCS of retransmission based at least in part on the worst link among links connecting itself and the NACK devices in its SUBSET. Since NACK devices in SUBSET have higher channel quality with the corresponding ACK device, the selected MCS of retransmission may be high order. The NACK devices in SUBSET can be represented by using BITMAP. For example, as shown in FIG. 6c, where device #4 is an ACK device, MCS of retransmission (which is denoted as $MCS_2$) is selected according the worst link of links connecting device #4 and device #5 & #6. The SUBSET of {device #5, device #6} may be represented by BITMAP of [0, 0, 0, 0, 1, 1, 0]. In this example, BITMAP is a bit vector where each bit corresponds to a device in the cluster, "1" means the corresponding device is in SUBSET and "0" not in SUBSET. In the aggressive mode, both $MCS_2$ and BITMAP are fed back to the BS as illustrated in FIG. 8.

Figure 8:
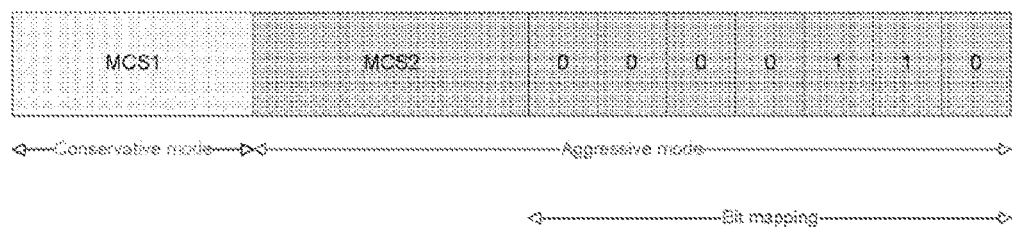
FIG. 8 exemplarily shows implementation of uplink signaling for an ACK device in accordance with an embodiment of the present invention.

According to an exemplary embodiment, once the BS receives all the $MCS_1$, $MCS_2$ and BITMAP as in FIG. 8 from every ACK device, the BS can make a choice between selecting only one ACK device in conservative mode to retransmit the transport block and selecting multiple ACK devices in aggressive mode to retransmit the transport block. For example, if multiple ACK devices in aggressive mode are selected, then each of the selected ACK devices may multicast the current transport block to NACK devices in its SUBSET, and each of the selected ACK devices may use orthogonal resource for the mentioned multicast. In this case, the union of SUBSETs specified for the selected ACK devices covers all the NACK devices in the cluster. Note that since only ACK devices feedback, the BS can infer which devices in the cluster are NACK devices.

Figure 6D:
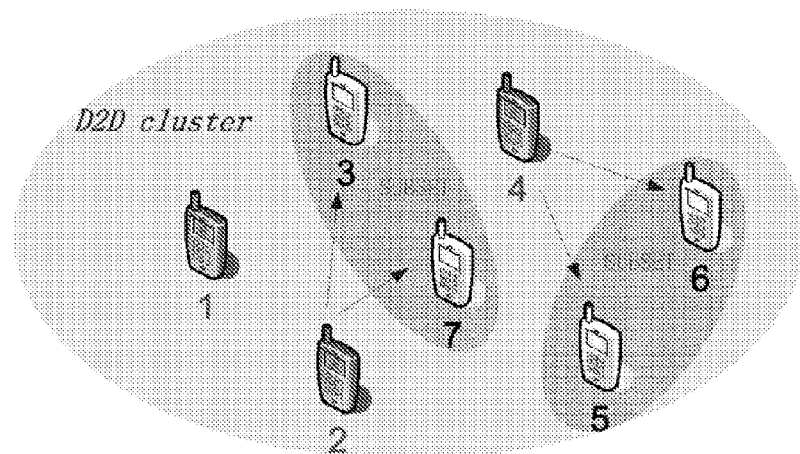
FIG. 6d exemplarily shows a situation where devices #2 and #4 retransmit the transport block using the aggressive mode, in accordance with an embodiment of the present invention.

In an exemplary embodiment, the network node may make a decision of retransmission modes according to least resource cost criterion. For example, the network node such as the BS in FIG. 6a may have a table after ACK devices feedback, where the union of SUBSET specified for device #2 and SUBSET specified for device #4 covers all the NACK devices in the cluster. Then, the BS may calculate the resource cost on the D2D retransmission for (i) device #1, in conservative mode (equation (4)); (ii) device #2, in conservative mode (equation (4)); (iii) device #4, in conservative mode (equation (4)); and (iv) devices #2 and #4, in aggressive mode (equation (5)). If option (iv) has the least resource cost, devices #2 and #4 can be assigned as senders in the D2D retransmission and they multicast the transport block to each SUBSET respectively, as shown in FIG. 6d.

$$\text{resource\_cost}^{conservative\_mode} = \frac{\text{information bits of retransmission}}{\text{modulation order of } MCS_1 \times \text{codingrate of } MCS_1} \quad (4)$$

$$\text{resource\_cost}^{aggressive\_mode} = \frac{\text{information bits of retransmission}}{\text{modulation order of } MCS_2^{(device\ \#2)} \times \text{codingrate of } MCS_2^{(device\ \#2)}} + \frac{\text{information bits of retransmission}}{\text{modulation order of } MCS_2^{(device\ \#4)} \times \text{codingrate of } MCS_2^{(device\ \#4)}} \quad (5)$$

Figure 9:
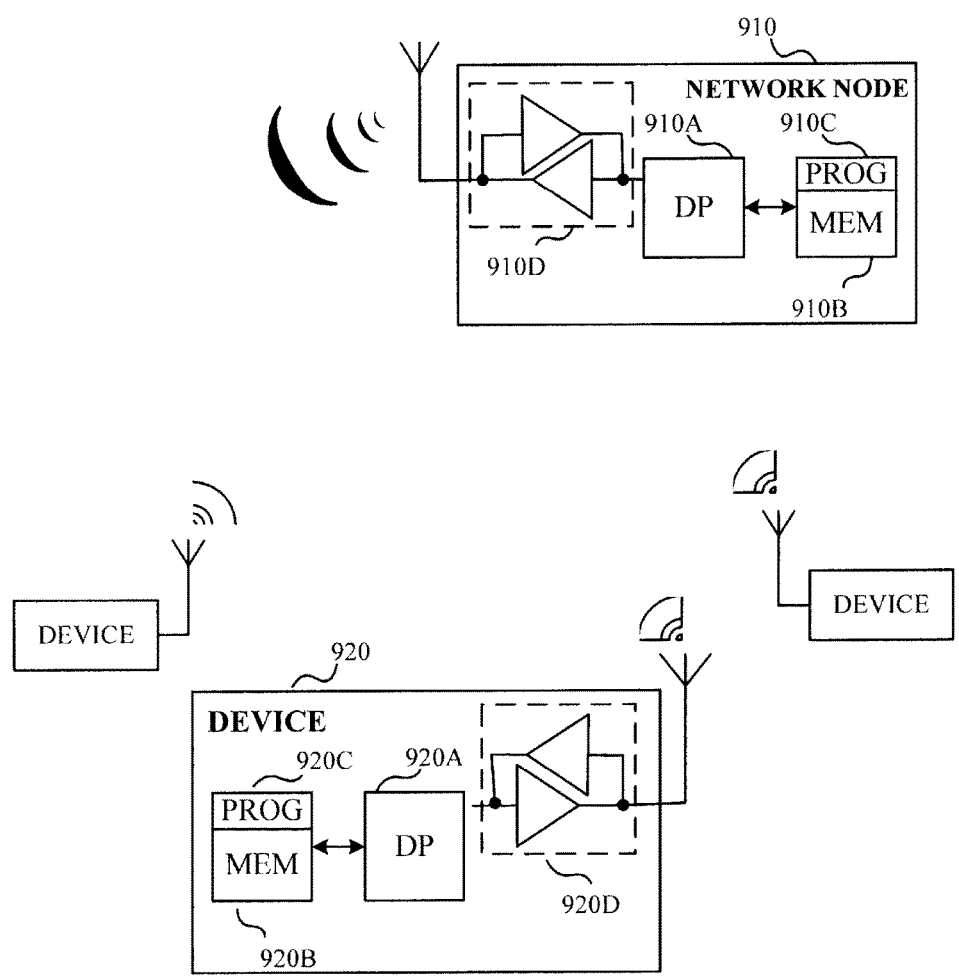
FIG. 9 is a simplified block diagram of various apparatuses which are suitable for use in practicing exemplary embodiments of the present invention.

Now reference is made to FIG. 9 illustrating a simplified block diagram of various apparatuses which are suitable for use in practicing exemplary embodiments of the present invention. In FIG. 9, a network node 910 such as a BS/eNB/AP/control center may be adapted for communicating with one or more devices (denoted as device 920 in general). In an exemplary embodiment, the network node 910 may comprise a data processor (DP) 910A, a memory (MEM) 910B that stores a program (PROG) 910C, and a suitable radio frequency (RF) transceiver 910D for communicating with a device (such as device 920) via one or more antennas. For example, the transceiver 910D in the network node 910 may be an integrated component for transmitting and/or receiving signals and messages. Alternatively, the transceiver 910D may comprise separate components to support transmitting and receiving signals/messages, respectively. The DP 910A may be used for processing these signals and messages. Alternatively or additionally, the network node 910 may comprise various means and/or components for implementing functions of the foregoing steps and methods in FIG. 3. For example, the network node 910 may comprise: receiving means for receiving parameters of a first and a second retransmission modes from each of ACK devices in a cluster; and performing means for performing a selection between the first and the second retransmission modes based at least in part on the parameters according to a pre-determined criterion, for example, the least resource cost criterion.

According to an exemplary embodiment, the device 920 may also comprise a DP 920A, a MEM 920B that stores a PROG 920C, and a suitable RF transceiver 920D. The transceiver 920D in the device 920 can be used for communicating with a network node (such as the network node 910) and/or another device within a cluster. For example, the transceiver 920D may be an integrated component for transmitting and/or receiving signals and messages. Alternatively, the transceiver 920D may comprise separate components to support transmitting and receiving signals/messages, respectively. The DP 920A may be used for processing these signals and messages. According to another exemplary embodiment, the device 920, such as a mobile device, a UE, a wireless terminal, a portable computer or the like, may comprise various means and/or components for implementing functions of the foregoing steps and methods in FIG. 2. For example, in case that the device 920 decodes data from a network node correctly, it may comprise: calculating means for calculating parameters of a first and a second retransmission modes; reporting means for reporting the parameters to the network node; and determining means for determining whether or not to retransmit the data to at least one NACK device in the cluster, in response to a selection between the first and the second retransmission modes from the network node based at least in part on the parameters according to a pre-determined criterion.

At least one of the PROGs 910C, 920C is assumed to comprise program instructions that, when executed by the associated DP, enable the electronic device to operate in accordance with the exemplary embodiments, as discussed above. That is, the exemplary embodiments of the present invention may be implemented at least in part by computer software executable by the DP 910A of the network node 910 and by the DP 920A of the device 920, or by hardware, or by a combination of software and hardware. The basic structure and operation of the network node 910 such as a BS and the device 920 such as a UE are known to one skilled in the art.

The MEMs 910B and 920B may be of any type suitable to the local technical environment and may be implemented using any suitable data storage technology, such as semiconductor based memory devices, flash memory, magnetic memory devices and systems, optical memory devices and systems, fixed memory and removable memory. The DPs 910A and 920A may be of any type suitable to the local technical environment, and may comprise one or more of general purpose computers, special purpose computers, microprocessors, digital signal processors (DSPs) and processors based on multi-core processor architectures, as non-limiting examples.

To evaluate the proposed D2D retransmission mode feedback and selection algorithm, the performances of the following three different schemes are compared by simulation.

Scheme 1: D2D retransmission mode is fixed to be conservative mode. Only one ACK device participates in the D2D intra-cluster retransmission.

Scheme 2: D2D retransmission mode is fixed to be aggressive mode. More than one ACK devices participate in the D2D intra-cluster retransmission.

Scheme 3: D2D retransmission mode is adaptively selected to be conservative mode or aggressive mode according to the aforementioned least resource cost criterion. The number of ACK devices participating in the D2D intra-cluster retransmission is adaptively selected.

In the simulation, for each drop the spectrum efficiencies of D2D links are randomly selected from the vector [1, 2, 4, 6, 8] bit/s/Hz, which is corresponding to the modulation [BPSK, QPSK, 16QAM, 64QAM, 256QAM]. The simulation is performed for three different D2D cluster sizes, 5-device cluster, 10-device cluster and 15-device cluster. For each cluster size, multiple ratios of ACK device number to NACK device number within the cluster are simulated.

Figure 10A:
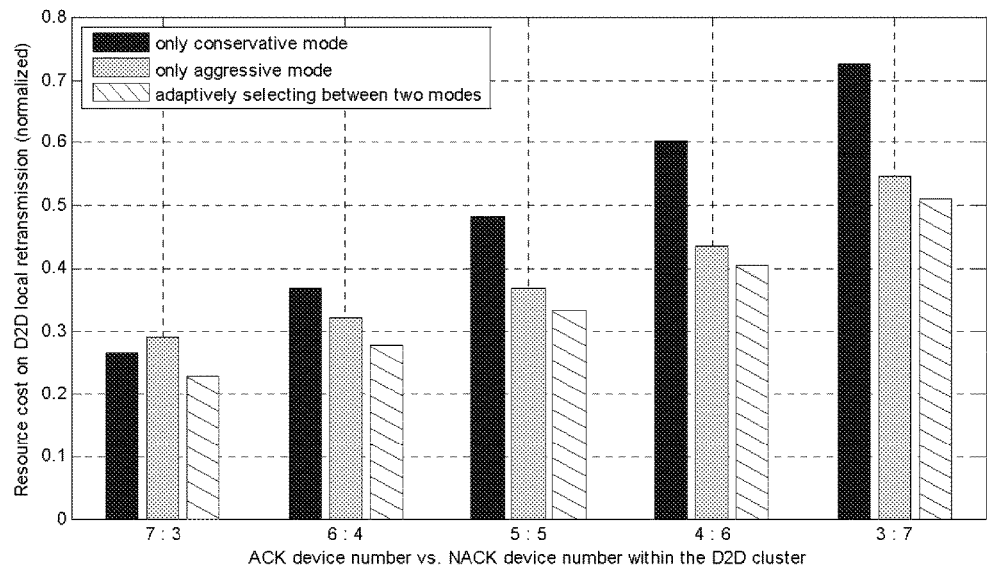
FIG. 10a is an exemplary diagram of normalized resource cost on the D2D local retransmission for a 10-device cluster, in accordance with an embodiment of the present invention.

FIG. 10a compares the normalized resource cost on D2D retransmission of the three schemes in the 10-device cluster case. It can be seen that for all the ACK vs. NACK ratios, the resource cost of the proposed adaptive scheme is always the minimal one among the three schemes. With the increase of NACK device number in a cluster, the improvement on resource cost reduction is more obvious. The resource costs of the proposed adaptive scheme over those of the only conservative mode scheme decreases from 86.23% to nearly 70% (which is also shown in Table 1).

Figure 10B:
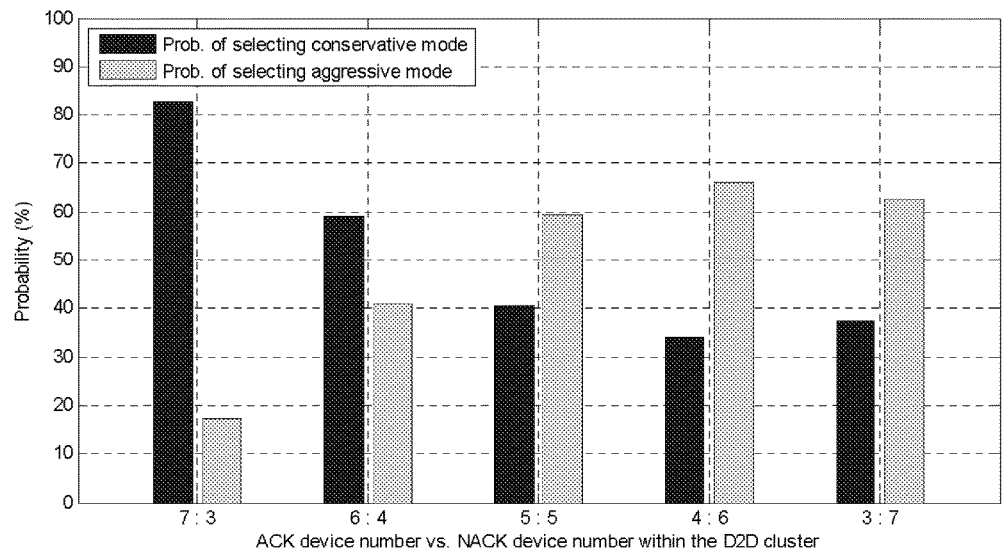
FIG. 10b is an exemplary diagram of probabilities of selecting one sender and two senders in the proposed adaptive scheme for 10-device cluster, in accordance with an embodiment of the present invention.
Figure 10C:
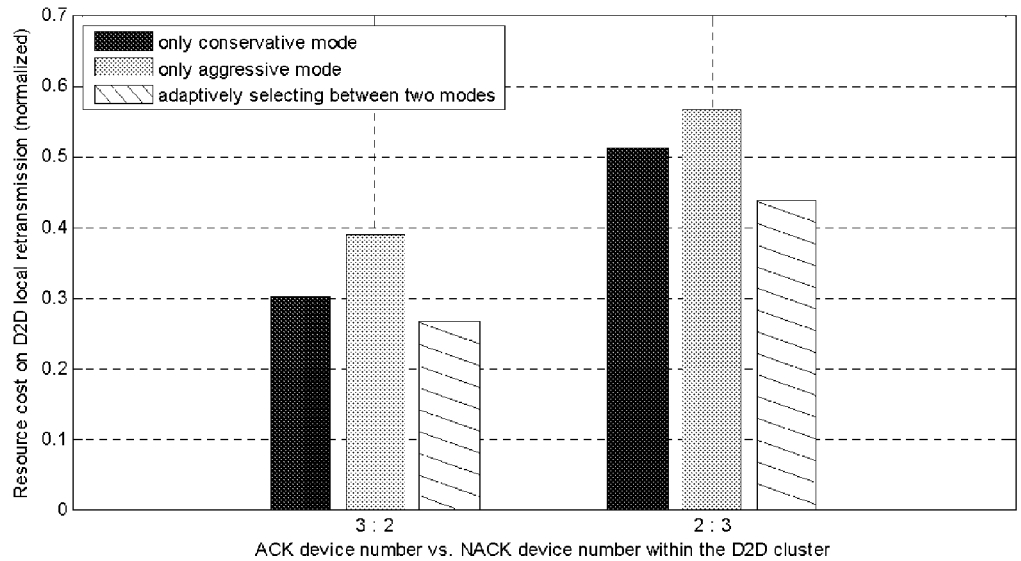
FIG. 10c is an exemplary diagram of normalized resource cost on the D2D local retransmission for a 5-device cluster, in accordance with an embodiment of the present invention.
Figure 10D:
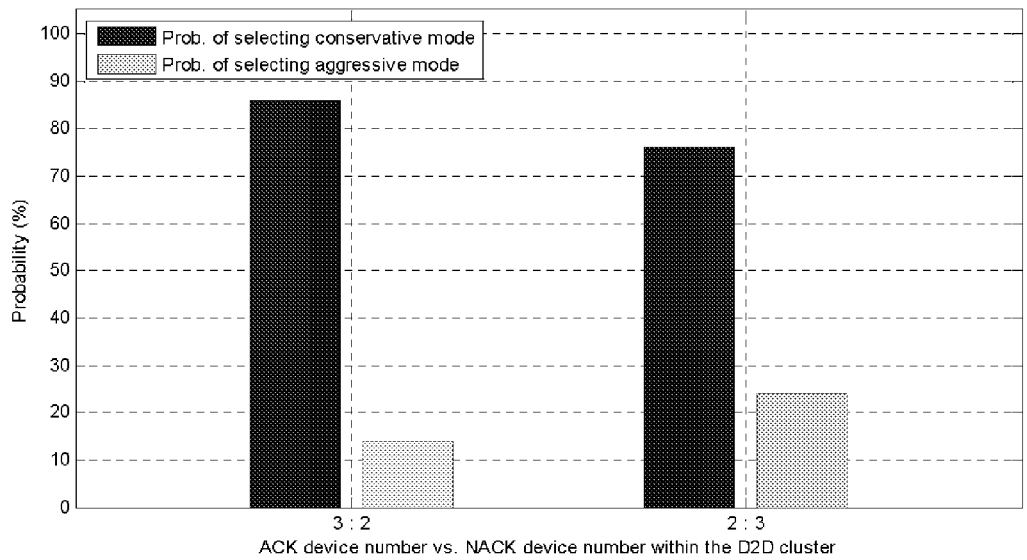
FIG. 10d is an exemplary diagram of probabilities of selecting one sender and two senders in the proposed adaptive scheme for 5-device cluster, in accordance with an embodiment of the present invention.
Figure 10E:
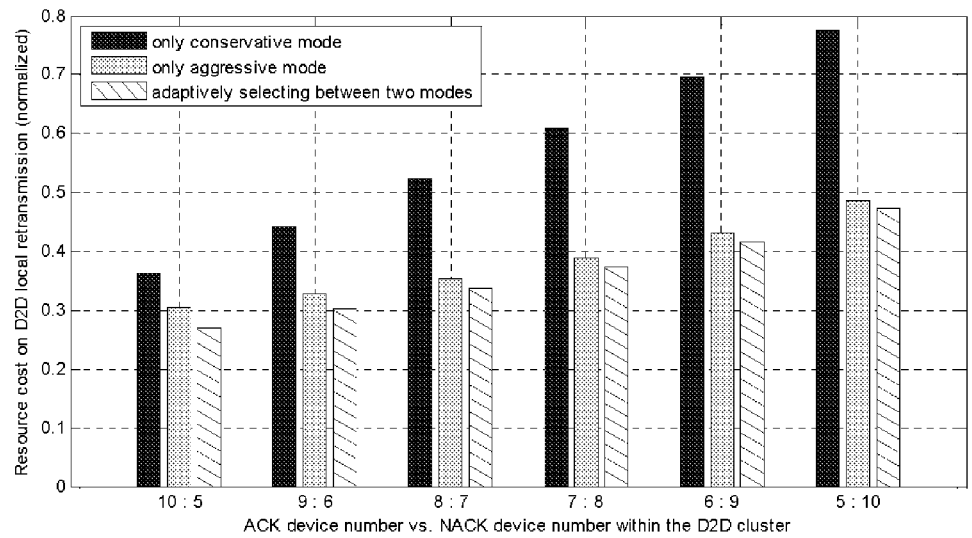
FIG. 10e is an exemplary diagram of normalized resource cost on the D2D local retransmission for a 15-device cluster, in accordance with an embodiment of the present invention.
Figure 10F:
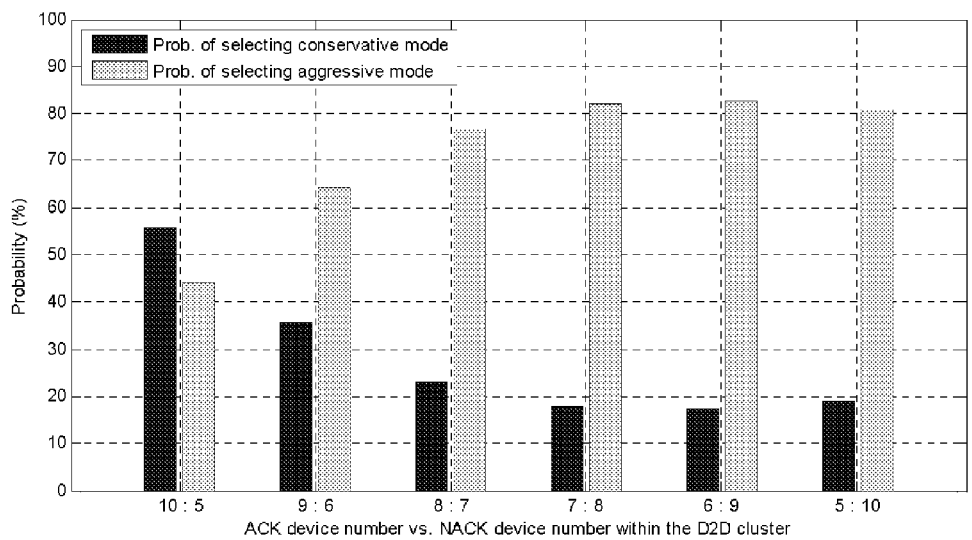
FIG. 10f is an exemplary diagram of probabilities of selecting one sender and two senders in the proposed adaptive scheme for 15-device cluster, in accordance with an embodiment of the present invention.

FIGS. 10c&d and Table 2 give the performance comparison in the 5-device cluster case. FIGS. 10e&f and Table 3 show the performance comparison in the 15-device cluster case. For both of the above simulations, the same conclusions can be drawn as those in the 10-device cluster case. In addition, it can be easily found that with the increase of cluster size, the advantage of the proposed adaptive scheme on resource cost reduction is becoming more notable. The minimal percent of $cost_p/cost_1$ in the 15-device cluster case is almost 60% whereas that in the 5-device cluster case is 85.65%.

From the above analysis, it can be realized that the adaptive scheme proposed in the present invention can significantly reduce resource cost on the D2D local retransmission for cellular multicast enhancement. With the increase of D2D cluster size and NACK device number in the cluster, the advantages of the proposed scheme on resource cost reduction is becoming more notable, which make possible large D2D cluster size.

TABLE 1

Normalized resource cost on the D2D local retransmission for a 10-device cluster

| | ACK vs. NACK | | | | |
|---|---|---|---|---|---|
| | 7:3 | 6:4 | 5:5 | 4:6 | 3:7 |
| Scheme | | | | | |
| $cost_1$: only conservative mode | 0.2648 | 0.3672 | 0.4815 | 0.6032 | 0.7254 |
| $cost_2$: only aggressive mode | 0.2892 | 0.3220 | 0.3674 | 0.4352 | 0.5466 |
| $cost_p$: adaptive selecting scheme | 0.2284 | 0.2778 | 0.3332 | 0.4041 | 0.5096 |
| Other results & Analysis | | | | | |
| Prob. of selecting conservative mode | 82.61% | 59.11% | 40.75% | 33.86% | 37.54% |
| Prob. of selecting aggressive mode | 17.39% | 40.89% | 59.25% | 66.14% | 62.46% |
| Gain 1: $cost_p/cost_1$ | 86.23% | 75.63% | 69.20% | 67.00% | 70.24% |
| Gain 2: $cost_p/cost_2$ | 78.96% | 86.27% | 90.69% | 92.86% | 93.22% |

The mode selection results are collected from 500,000 independent drops and the possibilities of selecting conservative mode and aggressive mode in Scheme 3 are calculated, which are shown in FIG. 10b and Table 1. It can be seen that with the increase of the NACK device number, the aggressive mode is more preferred.

TABLE 2

Normalized resource cost on the D2D local retransmission for a 5-device cluster

| | ACK vs. NACK | |
|---|---|---|
| | 3:2 | 2:3 |
| Scheme | | |
| $cost_1$: only conservative mode | 0.3003 | 0.5118 |
| $cost_2$: only aggressive mode | 0.3898 | 0.5655 |
| $cost_p$: adaptive selecting scheme | 0.2654 | 0.4384 |
| Other results & Analysis | | |
| Prob. of selecting conservative mode | 85.99% | 76.03% |
| Prob. of selecting aggressive mode | 14.01% | 23.97% |
| Gain 1: $cost_p/cost_1$ | 88.37% | 85.65% |
| Gain 2: $cost_p/cost_2$ | 68.08% | 77.53% |

TABLE 4

Comparison of uplink control signaling cost

| | Resource/ power efficiency | Number of CQI/MCS feedback overhead in cellular link | Additional overhead |
|---|---|---|---|
| Scheme 1 | + | $N_{ACK}$ | No |
| Scheme 2 | + | $N_{ACK} \times 2$ | No |
| Scheme 3 | +++ | $N_{ACK} \times 3$ | No |
| Scheme 4 | − | $N_{ACK} \times N_{NACK}$ | No |

TABLE 3

Normalized resource cost on the D2D local retransmission for a 15-device cluster

| | ACK vs. NACK | | | | | |
|---|---|---|---|---|---|---|
| Scheme | 10:5 | 9:6 | 8:7 | 7:8 | 6:9 | 5:10 |
| $cost_1$: only conservative mode | 0.3622 | 0.4423 | 0.5246 | 0.6100 | 0.6954 | 0.7755 |
| $cost_2$: only aggressive mode | 0.3033 | 0.3268 | 0.3542 | 0.3872 | 0.4292 | 0.4852 |
| $cost_p$: adaptive selecting scheme | 0.2702 | 0.3025 | 0.3368 | 0.3739 | 0.4168 | 0.4712 |
| Other results & Analysis | | | | | | |
| Prob. of selecting conservative mode | 55.73% | 35.84% | 23.19% | 17.81% | 17.34% | 18.96% |
| Prob. of selecting aggressive mode | 44.27% | 64.16% | 76.81% | 82.19% | 82.66% | 81.04% |
| Gain 1: $cost_p/cost_1$ | 74.59% | 68.40% | 64.20% | 61.29% | 59.93% | 60.75% |
| Gain 2: $cost_p/cost_2$ | 89.06% | 92.57% | 95.09% | 96.56% | 97.11% | 97.11% |

TABLE 4-continued

Comparison of uplink control signaling cost

| | Resource/ power efficiency | Number of CQI/MCS feedback overhead in cellular link | Additional overhead |
|---|---|---|---|
| Scheme 5 | – | 1 | Overhead caused by cluster head's failure reception |

Note:
"–" means the efficiency is low;
"+" means the efficiency is high; and
"+++" means the efficiency is very high or extremely high.

The comparison of the uplink signaling cost between different schemes is summarized in Table 4 for a centralized scheduling method. Compared with Scheme 4 (in which all the ACK devices in the cluster participate the D2D retransmission), the CQI/MCS feedback of Scheme 3 (proposed in the present invention) is clearly reduced. Although Scheme 5 (in which one pre-defined device such as a cluster head is assigned for the D2D retransmission) has the least feedback in cellular link, the additional overhead and delay caused by the cluster head's failure decoding is large and may be unendurable. Compared with Schemes 1&2, the CQI/MCS feedback of Scheme 3 slightly increased, but in return it has the highest resource efficiency as illustrated by the simulations. Thus it is worth taking into account the proposed instantaneous link adaptation and adaptive re-transmitter(s) selection scheme.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It will be appreciated that at least some aspects of the exemplary embodiments of the inventions may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), and etc. As will be realized by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

Although specific embodiments of the invention have been disclosed, those having ordinary skill in the art will understand that changes can be made to the specific embodiments without departing from the spirit and scope of the invention. The scope of the invention is not to be restricted therefore to the specific embodiments, and it is intended that the appended claims cover any and all such applications, modifications, and embodiments within the scope of the present invention.

What is claimed is:

1. A method, comprising:
    determining, by an acknowledgment device in a device-to-device cluster, at least a first modulation and coding scheme for a first retransmission mode, the first retransmission mode based on at least a first set of parameters comprising the first modulation and coding scheme;
    determining, by the acknowledgement device, at least a second modulation and coding scheme for a second retransmission mode, the second retransmission mode based on at least a second set of parameters comprising the second modulation and coding scheme, wherein the acknowledgement device decodes data from a base station correctly, wherein the first set of parameters and the second set of parameters are determined for subsequent transmission of the data between the acknowledgement device and at least one non-acknowledgement device in the device-to-device cluster, wherein the at least one non-acknowledgement device does not decode the data from the base station correctly;
    reporting, by the acknowledgment device and before a selection by the base station, at least the first set of parameters and the second set of parameters to the base station; and
    multicasting, by the acknowledgment device and in response to the selection by the base station, the data according to the first retransmission mode or the second retransmission mode to the at least one non-acknowledgement device, wherein the selection is between the first set of parameters and the second set of parameters.

2. The method according to claim 1, wherein the multicasting comprises:
    multicasting the data to all of the at least one non-acknowledgement device when the acknowledgement device is assigned as a sender in the first retransmission mode, wherein the at least one non-acknowledgement device comprises a plurality of non-acknowledgement devices; and
    multicasting the data to a subset of the at least one non-acknowledgement device when the acknowledgement device is assigned as a sender in the second retransmission mode.

3. The method according to claim 1, wherein the first modulation and coding scheme is selected based at least in part on a link with a lowest channel quality connecting the acknowledgement device and the at least one non-acknowledgement device.

4. The method according to claim 1, further comprising:
    determining a bitmap representing a subset of the at least one non-acknowledgement device,
    wherein the second modulation and coding scheme is selected based at least in part on a link with a lowest channel quality connecting the acknowledgement device and the subset of the at least one non-acknowledgement device, and
    wherein the lowest channel quality between the acknowledgement device and the subset of the at least one non-acknowledgement device is higher than channel quality between the acknowledgement device and the at least one non-acknowledgement devices which are not in the subset.

5. An apparatus, comprising:
at least one processor; and
at least one memory including computer program code,
the at least one memory and the computer program code configured to, with the at least one processor, cause the apparatus to at least:
  determine at least a first modulation and coding scheme for a first retransmission mode, the first retransmission mode based on at least a first set of parameters comprising the first modulation and coding scheme;
  determine at least a second modulation and coding scheme for a second retransmission mode for the apparatus in a device-to-device cluster, the second retransmission mode based on at least a second set of parameters comprising the second modulation and coding scheme, wherein the apparatus decodes data from a base station correctly, wherein the first set of parameters and the second set of parameters are determined for subsequent transmission of the data between the apparatus and at least one non-acknowledgement device in the device-to-device cluster, wherein the at least one non-acknowledgement device does not decode the data from the base station correctly;
  report, before a selection by the base station, at least the first set of parameters and the second set of parameters to the base station; and
  multicast, in response to the selection by the base station, the data according to the first retransmission mode or the second retransmission mode to the at least one non-acknowledgement device, wherein the selection is between the first set of parameters and the second set of parameters.

6. The apparatus according to claim 5, wherein the apparatus is further caused to at least:
  multicast the data to all of the at least one non-acknowledgement device when the apparatus is assigned as a sender in the first retransmission mode, wherein the at least one non-acknowledgement device comprises a plurality of non-acknowledgement devices; and
  multicast the data to a subset of the plurality of the at least one non-acknowledgement device when the apparatus is assigned as a sender in the second retransmission mode.

7. The apparatus according to claim 5, wherein the first modulation and coding scheme is selected based at least in part on a link with a lowest channel quality connecting the apparatus and the at least one non-acknowledgement device.

8. The apparatus according to claim 5, wherein the apparatus is further caused to at least: determine a bitmap representing a subset of the at least one non-acknowledgement device,
  wherein the second modulation and coding scheme is selected based at least in part on a link with a lowest channel quality connecting the apparatus and the subset of the at least one non-acknowledgement device, and
  wherein the lowest channel quality between the apparatus and the subset of the at least one non-acknowledgement device is higher than channel quality between the apparatus and the at least one non-acknowledgement devices which are not in the subset.

9. The apparatus according to claim 5, wherein a plurality of acknowledgement devices are assigned as senders of the data to a plurality of subsets of the at least one non-acknowledgement device when the second retransmission mode is selected, and wherein the plurality of the plurality of subsets cover all non-acknowledgement devices in the device-to-device cluster.

10. The apparatus according to claim 5, wherein the apparatus is further caused to at least:
  calculate parameters of the first retransmission mode and the second retransmission mode by at least checking pilots broadcasted by a plurality of devices in the device-to-device cluster to determine at least one of which of the plurality of devices are non-acknowledgement devices, and channel quality between the apparatus and the non-acknowledgement devices.

11. A computer program product comprising a non-transitory computer-readable medium bearing computer program code embodied therein for use with a computer, the computer program code comprising:
  determining, by an acknowledgment device in a device-to-device cluster, at least a first modulation and coding scheme for a first retransmission mode, the first retransmission mode based on at least a first set of parameters comprising the first modulation and coding scheme;
  determining, by the acknowledgement device, at least a second modulation and coding scheme for a second retransmission mode, the second retransmission mode based on at least a second set of parameters comprising the second modulation and coding scheme,
  wherein the acknowledgement device decodes data from a base station correctly, wherein the first set of parameters and the second set of parameters are determined for subsequent transmission of the data between the acknowledgement device and at least one non-acknowledgement device in the device-to-device cluster, wherein the at least one non-acknowledgement device does not decode the data from the base station correctly;
  reporting, by the acknowledgment device and before a selection by the base station, at least the first set of parameters and the second set of parameters to the base station; and
  multicasting, by the acknowledgment device and in response to the selection by the base station, the data according to the first retransmission mode or the second retransmission mode to the at least one non-acknowledgement device, wherein the selection is between the first set of parameters and the second set of parameters.

12. A method, comprising:
  receiving, from at least one acknowledgement device in a device-to-device cluster and prior to selecting a mode, information indicative of: a first set of parameters comprising a first modulation and coding scheme for a first retransmission mode, and a second set of parameters comprising a second modulation and coding scheme for a second retransmission mode, wherein the acknowledgement device decodes data from a base station correctly, wherein the first set of parameters and the second set of parameters are determined for subsequent transmission of the data between the acknowledgement device and at least one non-acknowledgement device in the device-to-device cluster, wherein the at least one non-acknowledgement device does not decode the data from the base station correctly;
  selecting, based at least in part on the first set of parameters and/or the second set of parameters, the mode between the first retransmission mode and the second retransmission mode according to a pre-determined criterion; and assigning the at least one acknowledgement device to multicast the data to the at least one non-acknowledgement device based on the selected mode.

13. The method according to claim 12, wherein the at least one acknowledgement device is assigned as a sender to multicast the data to all of the at least one non-acknowledgement device when the first retransmission mode is selected, wherein the at least one non-acknowledgement device comprises a plurality of non-acknowledgement devices, wherein a plurality of acknowledgement devices are assigned as senders to multicast the data to a plurality of subsets of non-acknowledgement devices when the second retransmission mode is selected, and wherein the plurality of the subsets cover all non-acknowledgement devices in the device-to-device cluster.

14. The method according to claim 12, wherein the first modulation and coding scheme is selected based at least in part on a link with a lowest channel quality connecting the at least one acknowledgement device and the at least one non-acknowledgement device.

15. The method according to claim 12, further comprising:
receiving a bitmap representing a subset of the at least one non-acknowledgement device,
wherein the second modulation and coding scheme is selected based at least in part on a link with a lowest channel quality connecting the at least one acknowledgement device and the subset of the at least one non-acknowledgement device, and
wherein the lowest channel quality between the at least one acknowledgement device and the subset of the at least one non-acknowledgement device is higher than channel quality between the at least one acknowledgement device and the at least one non-acknowledgement devices which are not in the subset.

16. An apparatus, comprising:
at least one processor; and
at least one memory including computer program code,
the at least one memory and the computer program code configured to, with the at least one processor, cause the apparatus to perform at least the following:
receive, from at least one acknowledgement device in a device-to-device cluster and prior to a selection of a mode, information indicative of: a first set of parameters comprising a first modulation and coding scheme for a first retransmission mode, and a second set of parameters comprising a second modulation and coding scheme for a second retransmission mode, wherein the acknowledgement device decodes data from the apparatus correctly, wherein the first set of parameters and the second set of parameters are determined for subsequent transmission of the data between the acknowledgement device and at least one non-acknowledgement device in the device-to-device cluster, wherein the at least one non-acknowledgement device does not decode the data from the apparatus correctly;
select, based at least in part on the first set of parameters and/or the second set of parameters, the mode between the first retransmission mode and the second retransmission mode according to a pre-determined criterion; and
assign the at least one acknowledgement device to multicast the data to the at least one non-acknowledgement device based on the selected mode.

17. The apparatus according to claim 16, wherein the at least one acknowledgement device is assigned as a sender to multicast the data to all of the at least one non-acknowledgement device when the first retransmission mode is selected, wherein the at least one non-acknowledgement device comprises a plurality of non-acknowledgement devices, wherein a plurality of acknowledgement devices are assigned as senders to multicast the data to a plurality of subsets of non-acknowledgement devices when the second retransmission mode is selected, and wherein the plurality of the subsets cover all non-acknowledgement devices in the device-to-device cluster.

18. The apparatus according to claim 16, wherein the first modulation and coding scheme is selected based at least in part on a link with a lowest channel quality connecting the at least one acknowledgement device and the at least one non-acknowledgement device.

19. The apparatus according to claim 16, wherein the apparatus is further caused to at least:
receive a bitmap representing a subset of the at least one non-acknowledgement device,
wherein the second modulation and coding scheme is selected based at least in part on a link with a lowest channel quality connecting the at least one acknowledgement device and the subset of the at least one non-acknowledgement device, and
wherein the lowest channel quality between the at least one acknowledgement device and the subset of the at least one non-acknowledgement device is higher than channel quality between the at least one acknowledgement device and the at least one non-acknowledgement devices which are not in the subset.

20. A computer program product comprising a non-transitory computer-readable medium bearing computer program code embodied therein for use with a computer, the computer program code comprising:
receiving, from at least one acknowledgement device in a device-to-device cluster and prior to selecting a mode, information indicative of: a first set of parameters comprising a first modulation and coding scheme for a first retransmission mode, and a second set of parameters comprising second modulation and coding scheme for a second retransmission mode, wherein the acknowledgement device decodes data from a base station correctly, wherein the first set of parameters and the second set of parameters are determined for subsequent transmission of the data between the acknowledgement device and at least one non-acknowledgement device in the device-to-device cluster, wherein the at least one non-acknowledgement device does not decode the data from the base station correctly;
selecting, based at least in part on the first set of parameters and/or the second set of parameters, the mode between the first retransmission mode and the second retransmission mode according to a pre-determined criterion; and
assigning the at least one acknowledgement device to multicast the data to the at least one non-acknowledgement device based on the selected mode.

21. The method of claim 1, wherein the selection is based at least in part on the first modulation and coding scheme and the second modulation and coding scheme, according to a pre-determined criterion.

22. A method comprising:
determining, by an acknowledgment device in a device-to-device cluster, a first plurality of parameters for a first retransmission mode and a second plurality of parameters for a second retransmission mode, wherein the first plurality of parameters are determined to enable the acknowledgment device to retransmit the data according to a first modulation and coding scheme to all non-acknowledging devices in the device-to-device cluster, and wherein the second plurality of parameters are determined to enable the acknowledgment device to retransmit the data according to a second modulation and coding scheme to a subset of the non-acknowledging devices;

reporting, by the acknowledgment device and before multicasting the data, information indicative of the first plurality of parameters and the second plurality of parameters to the base station;

multicasting, by the acknowledgment device, the data to all of the non-acknowledging devices when the base station indicates that the first set of parameters are selected; and multicasting, by the acknowledgement device, the data to the subset of the non-acknowledging devices when the base station indicates that selects the second set of parameters are selected.

* * * * *